United States Patent [19]

Enomoto et al.

[11] 4,025,475
[45] May 24, 1977

[54] HIGH SOLID CONTENT ALKYD RESIN COMPOSITIONS COMPRISING (1-METHYL-2-VINYL)4,6-HEPTADIENYL-3,8-NONADIENOATE

[75] Inventors: Satoru Enomoto, Fujisawa; Hitoshi Takita, Tokyo; Hisayuki Wada, Tokyo; Yutaka Mukaida, Tokyo; Mikiro Yanaka, Matsudo, all of Japan

[73] Assignee: Kureha Kagaku Kogyo Kabushiki Kaisha, Tokyo, Japan

[22] Filed: Sept. 10, 1975

[21] Appl. No.: 611,917

[30] Foreign Application Priority Data

Sept. 18, 1974 Japan .............................. 49-106629

[52] U.S. Cl. .......................... 260/22 CB; 260/23 P; 428/458

[51] Int. Cl.² ...................... C09D 3/66; C09D 3/68

[58] Field of Search ...................... 260/22 CB, 23 P

[56] References Cited

UNITED STATES PATENTS

| | | | |
|---|---|---|---|
| 3,124,549 | 3/1964 | Salgado et al. | 260/22 CB |
| 3,296,336 | 1/1967 | Engelhardt | 260/22 CB |
| 3,810,855 | 5/1974 | Tugukuni et al. | 260/22 CB |
| 3,847,851 | 11/1974 | Tugukuni et al. | 260/22 CB |
| 3,920,595 | 11/1975 | Anderson et al. | 260/22 CQ |

*Primary Examiner*—Ronald W. Griffin
*Attorney, Agent, or Firm*—Flynn & Frishauf

[57] ABSTRACT

High solid type alkyd resin compositions comprising 90 to 10 percent by weight of alkyd resin and 10 to 90 percent by weight of (1-methyl-2-vinyl)4,6-heptadienyl-3,8-nonadienoate and compositions prepared, if necessary, by adding bodying agents, driers and/or a small amount of thinner.

7 Claims, No Drawings

HIGH SOLID CONTENT ALKYD RESIN COMPOSITIONS COMPRISING (1-METHYL-2-VINYL)4,6-HEPTADIENYL-3,8-NONADIENOATE

This invention relates to paint compositions and more particularly to high solid type alkyd resin compositions.

Alkyd paints hardenable by air oxidation at normal temperature have hitherto been used in large quantities as the most common type. Where this type of paint is used, it has been considered indispensable from the standpoint of coating efficiency to add a solvent to the paint for proper adjustment of its viscosity. However, the solvent is added only for easy painting operation and does not compose of the coated film. The used solvent pollutes the open air, giving a big problem of the air pollution. Therefore, such application of the solvent is not desired from the standpoint of assuring operators' health and saving the solvent material itself.

The high solid type alkyd resin composition in this invention is defined to contain less than 30% of the usual solvent or in another word the solid content must be more than 70%.

On the other hand, naturally produced drying oils such as linseed oil, soybean oil ad safflower oil constitute the main component of an unsaturated radical component used in the manufacture of alkyd resin which is hardened by air at normal temperature. Therefore, said drying oils display reactivity when used as a diluent for the alkyd resin.

However, these drying oils are very viscous and have to be applied in large quantities, where used as a diluent for the alkyd resin. Further, said drying oils themselves present a yellow color and have the disadvantage that where used with a light color paint such as the white type, they cause the paint to display an undesirable finish when coated. Accordingly, demand has been made from various quarters for development of a novel high solid type alkyd resin composition which can resolve drawbacks accompanying the prior art due to inclusion of an active diluent of low viscosity and low volatility concurrently acting as a modifier for the alkyd resin by reacting therewith.

This invention has been accomplished for the object of providing novel high solid type alkyd resin paint compositions which can resolve the technical problems of the prior art and also display excellent properties. A high solid type alkyd resin paint composition according to this invention comprises 90 to 10 percent by weight of alkyd resin and 10 to 90 percent by weight of (1-methyl-2-vinyl)4,6-heptadienyl-3,8-nonadienoate.

The high solid type alkyd resin paint composition of this invention includes (1-methyl-2-vinyl)4,6-heptadienyl-3,8-nonadienoate as a reactive diluent having a lower viscosity and volatility than any known common paint solvent, and displays excellent properties, thus offering great usefulness industrial application.

(1-methyl-2-vinyl)4,6-heptadienyl-3,8-nonadienoate, a component of the high solid type alkyd resin paint composition of this invention, is a novel substance developed for the first time by the present inventors and has the following chemical structure and physical properties:

Molecular formula: $C_{19}H_{28}O_2$
Structural formula:

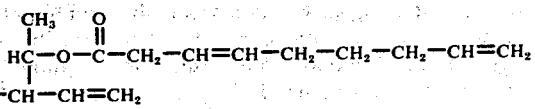

Molecular weight: 288
Boiling point: 133° to 133.5 C/1 mm Hg
Refractive index $n_D^{20}$: 1.4787
Viscosity: 6 centistokes (20° C)

As apparent from the foregoing description, (1-methyl-2-vinyl)4,6-heptadienyl-3,8-nonadienoate is a reactive diluent having a high boiling point, low volatility and low viscosity for the alkyd resin which also acts as a modifier by reacting therewith. Development of this novel substance has enabled an alkyd resin to be used as a high solid paint and the paint composition of this invention to display excellent properties.

The alkyd resin, the other component of the paint composition of this invention, is set forth in "Encyclopedia of Chemical Technology" by Kirk and Othmer, second edition, Volume 1 (Interscience Publishers, 1963) pp. 851 to 883. Said alkyd resin is a drying type consisting of a condensate of polyhydric alcohol, polybasic acid and unsaturated fatty acid.

The proportion of (1-methyl-2-vinyl)4,6-heptadienyl-3,8-nonadienoate included in the high solid type alkyd resin paint composition of this invention is chosen to be, as previously mentioned, 10 to 90 percent by weight. Where the content of said component exceeds 90 percent by weight, then the resultant alkyd resin paint composition is deteriorated in quality as the alkyd resin paint. Conversely where the content of said component decreases from 10 percent by weight, then the resultant paint composition becomes more viscous, presenting difficulties in application.

Like the ordinary alkyd resin paint, the composition of this invention can be modified by adding inorganic and organic pigments and body agents. The inorganic pigments include white pigments such as titanium white, zinc white, white lead, lithophone and basic lead sulfate; black pigments such as carbon black; red pigments such as minium, cadmium red and vermilion; yellow pigments such as chrom yellow, zinc yellow and cadmium yellow; blue pigments such as prussian blue, ultramarine, cobalt blue and brunswick blue; green pigments such as chrom green, chrom oxide green and emerald green; and brown pigments such as Red oxide. The organic pigments include red pigments such as para red and toluidine red; yellow pigments such as auramine lake; blue pigments such as phthalcocyanine blue; and green pigments such as Guignet green. The bodying agents include calcium carbonate, precipitated calcium carbonate, clay, gypsum and barite. The driers include metal napthenates such as cobalt naphthenate, manganese naphthenate, lead naphthenate and calcium naphthenate used alone or in combination.

Further, the subject alkyd resin paint composition may be mixed, where necessary, with a small amount of thinner to provide a type having a lower concentration of thinner than the prior art alkyd resin paint.

This invention will be more fully understood by reference to the examples which follow.

EXAMPLE 1

Two types of alkyd resin component were obtained from an alkyd resin paint manufactured by the Japan Reichhold Chemicals Inc. under the trade name "Beckosol" (containing soybean oil as an oily component and having a phthalic acid content of 24% and and oil length of 65%) and an alkyd resin paint manufactured by the Hitachi Chemical Co., Ltd, under the trade name "Phthalkyd 235-50" (containing soybean oil) by removing a solvent from said resin paints at vacuum. The two types of alkyd resin, (1-methyl-2-vinyl)4,6-heptadienyl-3,6-nonadienoate and cobalt naphthenate as a drier were blended together in the proportions shown in Table 1 below, providing a clear paint. Determination was made of the coating characteristic and non volatile matter content of said paint by the test method specified in the Japanese Industrial Standard (JIS) K-5400, the results being also set forth in Table 1 below.

Table 1

|  |  |  | Present Invention | | | |
|---|---|---|---|---|---|---|
| | Experiment No. | | 1-1 | 1-2 | 1-3 | 1-4 |
| Composition | (1-methyl-2-vinyl)4,6-heptadienyl-3,8-nonadienoate (parts by weight) | | 40 | 20 | 40 | 20 |
| | Beckosol P 470-70 (parts by weight) | | 60 | 80 | — | — |
| | Phthalkyd 235-50 (parts by weight) | | — | — | 60 | 80 |
| | 10% solution of cobalt naphthenate (parts by weight) | | 1 | 1 | 1 | 1 |
| Properties | Drying time at 25° C and 75% relative humidity | Touch free (hrs) | 2.0 | 1.0 | 1.5 | 1.0 |
| | | Dust free (hrs) | 6.0 | 4.0 | 4.0 | 3.0 |
| | | Set to handle (hrs) | 9.0 | 7.0 | 7.0 | 5.5 |
| | Pencil hardness | | H | H | 2H | 2H |
| | Non volatile matter content (%) | | 96.8 | 98.5 | 97.1 | 98.4 |

EXAMPLE 2

An alkyl resin obtained from Beckosol P470-70 used in Example 1, (1-methyl-2-vinyl)4,6-heptadienyl-3,8-nonadienoate, and various body agents shown in Table 2 below were blended together in the proportions also given in said Table 2 to prepare high solid type paint compositions. By way of comparison, high solid type paint compositions were prepared from (1-methyl-2-vinyl)4,6-heptadienyl-3,8-nonadienoate mixed with bodying agents, and also from a mixture of alkyd resin, linseed oil and bodying agents, and solvent type paint compositions were prepared from a mixture of alkyd resin, thinner and bodying agents. The proportions of the respective components of both high solid and solvent types of paint compositions are also shown in Table 2 below.

Table 2

| | | Present Invention | | | Controls | |
|---|---|---|---|---|---|---|
| | Experiment No. | 2-1 | 2-2 | 2-3 | 2-4 | 2-5 |
| Composition | (1-methyl-2-vinyl)4,6-heptadienyl-3,8-nonadienoate (parts by weight) | 21 | 28 | 31.5 | — | — |
| | Alkyd resin (parts by weight) | 14 | 7 | 3.5 | 35 | 3.5 |
| | Thinner (parts by weight) | — | — | — | 30.5 | — |
| | Linseed oil (parts by weight) | — | — | — | — | 31.5 |
| | Titanium oxide (parts by weight) | 25.0 | 25.0 | 25.0 | 25.0 | 25.0 |
| | Zinc flower (parts by weight) | 5.0 | 5.0 | 5.0 | 5.0 | 5.0 |
| | Calcium carbonate (parts by weight) | 20.0 | 20.0 | 20.0 | 20.0 | 20.0 |
| | 10% solution of cobalt naphthenate (parts by weight) | 0.35 | 0.35 | 0.35 | 0.35 | 0.35 |
| Properties | Viscosity at 25° C (a) (seconds) | 120 | 105 | 80 | 120 | 187 |
| | Non volatile matter content (b) (%) | 99.2 | 98.8 | 98.2 | 73.6 | 100 |

Note:
(a) Measured by the Ford Cup No. 4 test method specified in JIS K-5402
(b) Measured by the test method specified in the above-mentioned JIS K-5400

As seen from the results of viscosity measurement shown in Table 2 above, the paint compositions having the viscosity values of Samples of Experiment Nos. 2-1 to 2-4 admitted of easy brush coating. The paint composition of too low viscosity gave rise to running after application, presenting difficulties in maintaining coating, while the paint composition of too high viscosity obstructed brush coating. The paint composition of Experiment No. 2-5 containing linseed oil whose viscosity itself is higher than that of (1-methyl-2-vinyl)4,6-heptadienyl-3,8-nonadienoate indicated a high viscosity even when mixed with a large amount of linseed oil, barely admitting of brush coating.

The respective paint compositions listed in Table 2 above were coated on a mild steel plate and tin plate at the rate of 0.6 g/dm². After the coated paint compositions were allowed to stand for a week, measurement was made of their coating characteristic by the test method specified in JIS K-5400, the results being set forth in Table 3 below.

Table 3

|  | Experiment No. | Present Invention | | | Controls | |
|---|---|---|---|---|---|---|
|  |  | 2-1 | 2-2 | 2-3 | 2-4 | 2-5 |
| Coating Properties | Pencil Hardness (a) | 2H | 2H | 3H | 1H | softer than 4B |
|  | Flex resistance (mandrel) (a) (mm) | 2 | 2 | 2 | 2 | 2 |
|  | Checkered pattern test (b) | 100/100 | 100/100 | 100/100 | 100/100 | 95/100 |
|  | Impact Strength (a) (Du Pont process) (kg-ccm) | 0.5–50 | 0.5–50 | 0.5–40 | 0.5–50 | 1–50 |
|  | Erichsen test (c) (mm) | 7.5 | 7.5 | 7.0 | 8.0 | 8.0 |
| Immersion test | Water one week 20° C (a) | Excellent | Excellent | Excellent | Excellent | Excellent |
|  | 3% NaCl 4 days 20° C (a) | Excellent | Excellent | Excellent | Excellent | Discolored |
|  | Weather-O-meter in 600 hrs | Excellent | Excellent | Excellent | Excellent | Excellent |

Note:
(a) Measured by the test methods specified in the above-mentioned JIS K-5400
(b) Measured by the peel test, after an adhesive tape is attached to the respective coatings
(c) Measured by the test method specified in JIS K-7777

A coating of paint obtained by blending an alkyd resin with (1-methyl-2-vinyl)4,6-heptadienyl-3,8-nonadienoate was little inferior in properties to a coating of paint obtained by blending the alkyd resin with thinner and even superior to the latter with respect to brine proofness. A coating of paint consisting of the alkyd resin blended with linseed oil was too soft and indicated too low adhesivity for practical application, though the non volatile matter content of said paint was 100% as shown in Table 2.

EXAMPLE 3

Alkyd resin obtained from phthalkyd 235-50 used in Example 1, (1-methyl-2-vinyl)4,6-heptadienyl-3,8-nonadienoate and various bodying agents were blended in the proportions given in Table 4 below to prepare high solid type paint compositions. By way of comparison, solvent type paint compositions were prepared by blending an alkyd resin, thinner and bodying agents in the proportions also shown in Table 4 below. Measurement was made of the properties which both types of paint compositions exhibited as paint materials as well as when coated, the results being set forth also in Table 4 below. As apparent from Table 4, the paint compositions of this invention indicate a considerably small volatility, namely large non-volatile matter content and little inferior coating properties to those of the paint composition of the control.

Table 4

|  | Experiment No. | Present Invention | | Control |
|---|---|---|---|---|
|  |  | 3-1 | 3-2 | 3-3 |
| Composition | (1-methyl-2-vinyl)4,6-heptadienyl-3,8-nonadienoate (parts by weight) | 21.0 | 28.0 | — |
|  | Alkyd resin (parts by weight) | 14.0 | 7.0 | 35.0 |
|  | Thinner (parts by weight) | — | — | 55.5 |
|  | Titanium oxide (parts by weight) | 25.0 | 25.5 | 25.5 |
|  | Zinc flower (parts by weight) | 5.0 | 5.0 | 5.0 |
|  | Calcium carbonate (parts by weight) | 20.0 | 20.0 | 20.0 |
|  | 10% solution of cobalt naphthenate (parts by weight) | 0.2 | 0.3 | 0.2 |
|  | 30% solution of lead naphthenate (parts by weight) | 0.6 | 0.6 | 0.6 |
| Properties as paint material | Viscosity at 25° C (a) (second) | 119 | 171 | 121 |
|  | Non volatile matter (b) (mm) | 98.7 | 97.4 | 60.8 |
| coating properties | Pencil hardness (b) | 2H | 2H | 2H |
|  | Flax resistance (mandrel) (b) (mm) | 2 | 2 | 2 |
|  | Checkered pattern test (c) | 100/100 | 100/100 | 100/100 |
|  | Impact strength (Du Pont process) (b) (kg-cm) | 0.5–40 | 0.5–40 | 1–50 |
|  | Erichsen test (d) (mm) | 7.5 | 7.0 | 8.0 |
| Immersion test | Water one week 20° C (b) | Excellent | Excellent | Excellent |
|  | 3% NaCl 4 days 20° C (b) | Excellent | Excellent | Swelled |
|  | Weather-O-meter in 600 hrs (b) | Excellent | Excellent | Excellent |

Notes:
(a) Measured by the Ford Cup No. 4 test method specified in the above-mentioned JIS K-5402
(b) Measured by the test method specified in the above-mentioned JIS K-5400
(c) Measured by the same peel test as applied in Example 2, after an adhesive tape is attached to the respective coatings
(d) Measured by the test method specified in the above-mentioned JIS K-7777

What we claim is:

1. High solid content alkyd resin compositions comprising 90 to 10 percent by weight of alkyd resin and 10 to 90 percent by weight of (1-methyl-2vinyl)4,6-heptadienyl-3,8-nonadienoate.

2. High solid content alkyd resin compositions according to claim 1 containing a bodying agent selected from the group consisting of calcium carbonate, precipitated calcium carbonate, clay, gypsum and barite, and an inorganic pigment.

3. High solid content alkyd resin compositions according to claim 1 containing a drier.

4. High solid content alkyd resin compositions according to claim 3 wherein the drier is a metal napthenate.

5. High solid content alkyd resin compositions according to claim 1 containing a small amount of a thinner.

6. High solid content alkyd resin compositions according to claim 1 containing a bodying agent selected from the group consisting of calcium carbonate, precipitated calcium carbonate, clay, gypsum and barite, and an organic pigment.

7. High solid content alkyd resin compositions according to claim 1, wherein said compositions contain less than 30 percent by weight of volatile matter.

* * * * *